US007964992B2

(12) United States Patent
Apfel

(10) Patent No.: US 7,964,992 B2
(45) Date of Patent: Jun. 21, 2011

(54) CIRCUIT DEVICE INCLUDING MULTIPLE PARAMETERIZED POWER REGULATORS

(75) Inventor: Russell Apfel, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 458 days.

(21) Appl. No.: 12/210,410

(22) Filed: Sep. 15, 2008

(65) Prior Publication Data

US 2010/0066169 A1 Mar. 18, 2010

(51) Int. Cl.
*H02J 1/00* (2006.01)
*H02J 3/00* (2006.01)

(52) U.S. Cl. .......................................................... 307/82

(58) Field of Classification Search .................... 307/31, 307/80, 82

See application file for complete search history.

(56) References Cited

U.S. PATENT DOCUMENTS 3,944,909 A 3/1976 Reymond ........................ 323/45
4,532,467 A 7/1985 Mensink et al. .............. 323/316
4,893,228 A 1/1990 Orrick et al. .................... 363/89
5,294,879 A 3/1994 Freeman et al. ................ 322/23
5,298,851 A 3/1994 DeNardis ........................ 322/28
5,444,412 A 8/1995 Kowalski ...................... 327/541
5,774,734 A 6/1998 Kikinis et al. ........... 395/750.01
5,919,262 A 7/1999 Kikinis et al. ............... 713/300
5,952,733 A * 9/1999 Johnston ......................... 307/44
6,137,188 A 10/2000 Mitchell et al. ................. 307/29
6,177,785 B1 1/2001 Lee ............................... 323/281
6,288,526 B1 9/2001 Olah ............................. 323/316
7,253,625 B2 8/2007 Trabbic et al. ................ 324/322
7,292,019 B1 11/2007 Fernald ......................... 323/354
2001/0017595 A1 8/2001 Cliff et al. ....................... 341/78
2004/0189271 A1 9/2004 Hansson et al. .............. 323/283
2004/0263231 A1 12/2004 Trafton et al.
2005/0046405 A1 3/2005 Trafton et al. ................ 323/308
2005/0135023 A1 6/2005 Goder et al. ..................... 361/18
2006/0132108 A1 6/2006 Teggatz et al. ................ 323/282
2007/0046271 A1 3/2007 Zolfaghari .................... 323/274
2007/0069765 A1 3/2007 Cummings ...................... 326/46
2007/0114984 A1 5/2007 Li et al. ......................... 323/283
2007/0120543 A1 5/2007 Caldwell ....................... 323/272
2007/0139973 A1 6/2007 Leung ............................. 363/16
2007/0200538 A1 8/2007 Tang et al. .................... 323/237
2007/0229044 A1 10/2007 Visairo-Cruz et al. ........ 323/282
2007/0297235 A1 12/2007 Ballweber et al. ....... 365/185.22
2008/0067995 A1 3/2008 Chua-Eoan et al. .......... 323/284

OTHER PUBLICATIONS

Philips Semiconductors, Integrated Circuit Data Sheet, TDA3602, Jul. 1994, pp. 1-26.
Adjustable Precision Shunt Regulator, (ZR31L) Zetex Semiconductors, Issue 2, Aug. 2003, pp. 1-9.
KA337, 3-Terminal 1.5A Negative Adjustable Regulator, Fairchild Semiconductor Corporation, 2001, pp. 1-6.
FAN5355 1A/0.8A, 3MHz Digitally Programmable TinyBuck Regulator, Fairchild Seminconductor Corporation, Feb. 2008, pp. 1-27.
CMOS Programmable Micropower Positive Voltage Regulator, Data Sheet, Intersil, Jul. 21, 2005, pp. 1-8.
MAX667, Maxim +5V Programmable Low-Dropout Voltage Regulator, 1994, pp. 1-8.

* cited by examiner

*Primary Examiner* — Jared J Fureman
*Assistant Examiner* — Carlos Amaya
(74) *Attorney, Agent, or Firm* — Polansky & Associates, P.L.L.C.; R. Michael Reed

(57) ABSTRACT

In a particular embodiment, a circuit device includes a plurality of programmable voltage regulator circuits adapted to produce one or more unique power supplies. Each programmable voltage regulator circuit includes a power supply output terminal and a base regulator circuit module that has multiple configurable parameters to support a plurality of regulator configurations. The base regulator circuit module includes a plurality of leads. Each programmable voltage regulator circuit further includes selected circuitry coupled to the plurality of leads and to the power supply output terminal. The selected circuitry is adapted to cooperate with the base regulator circuit module to provide a selected type of regulator circuit and to apply a power supply to the power supply output terminal.

29 Claims, 9 Drawing Sheets

CIRCUIT DEVICE INCLUDING MULTIPLE PARAMETERIZED POWER REGULATORS

FIELD OF THE DISCLOSURE

The present disclosure is generally related to power regulators, and more particularly to a programmable, parameterized power regulator circuit.

BACKGROUND

In general, different integrated circuits can have different power supply requirements. Further, an integrated circuit may utilize multiple regulated power supplies at various power levels, such as 5V, 3.3V, 2.8V, 2.5V, 2.0V, 1.8V, 1.5V, 1.2V, 0.9V, other voltage levels, or any combination thereof. Generally, electronic devices include multiple voltage regulator circuits to generate the multiple stable output voltages from a varying input supply voltage. A voltage regulator is a circuit that is adapted to automatically maintain a constant output voltage at a desired voltage level.

Multiple power supplies may be provided using multiple fixed power regulator circuits to produce multiple output voltages. In a particular instance, a programmable power regulator may be used, where the output voltage signal provided by the programmable power regulator can be adjusted by adjusting a gain of a buffer circuit or attenuation circuit coupled to the programmable power regulator.

In some instances, a power regulator circuit can include several voltage regulators, including one or two voltage regulators that can be adjusted with respect to a single parameter and within a limited range. For example, a particular voltage regulator circuit includes two programmable voltage regulators that have fixed output currents but that can be adjusted to provide an output voltage within a range from 0.6 volts to 3.3 volts, depending on the configuration of the feedback network. However, such power regulator circuits typically provide few, if any, configurable options. Accordingly, the power regulator circuit is typically designed as a particular type of voltage regulator and is typically adjusted for each particular implementation.

SUMMARY

In a particular embodiment, a circuit device includes a plurality of programmable voltage regulator circuits adapted to produce one or more unique power supplies. Each programmable voltage regulator circuit includes a power supply output terminal and a base regulator circuit module that has multiple configurable parameters to support a plurality of regulator configurations. The base regulator circuit module includes a plurality of leads. Each programmable voltage regulator circuit further includes selected circuitry coupled to the plurality of leads and to the power supply output terminal. The selected circuitry is adapted to cooperate with the base regulator circuit module to provide a selected type of regulator circuit and to apply a power supply to the power supply output terminal.

In another particular embodiment, an integrated circuit includes a first fixed configuration regulator circuit having a first output to provide a first power supply and a second fixed configuration regulator circuit having a second output to provide a second power supply. The integrated circuit further includes one or more programmable parameterized regulator circuits. Each of the one or more programmable parameterized regulator circuits includes a power supply output to carry a unique power supply. Each of the one or more programmable parameterized regulator circuits includes a base regulator circuit module having multiple configurable parameters to support a plurality of regulator configurations. The base regulator circuit module includes a plurality of leads. Each of the one or more programmable parameterized regulator circuits also includes selected circuitry coupled to the plurality of leads and adapted to cooperate with the base regulator circuit module to provide a selected type of regulator circuit to provide a desired power supply to the power supply output.

In still another particular embodiment, an integrated circuit includes a plurality of programmable regulator circuits adapted to provide a respective plurality of regulated power supplies at a plurality of output terminals. Each programmable regulator circuit of the plurality of programmable regulator circuits includes a base regulator circuit module that has multiple configurable parameters to support a plurality of regulator configurations. The base regulator circuit module has a plurality of leads. Each programmable regulator circuit further includes selected circuitry coupled to the plurality of leads and adapted to cooperate with the base regulator circuit module to provide a selected type of regulator circuit having the power supply output.

DETAILED DESCRIPTION OF ILLUSTRATIVE EMBODIMENTS

Figure 1:
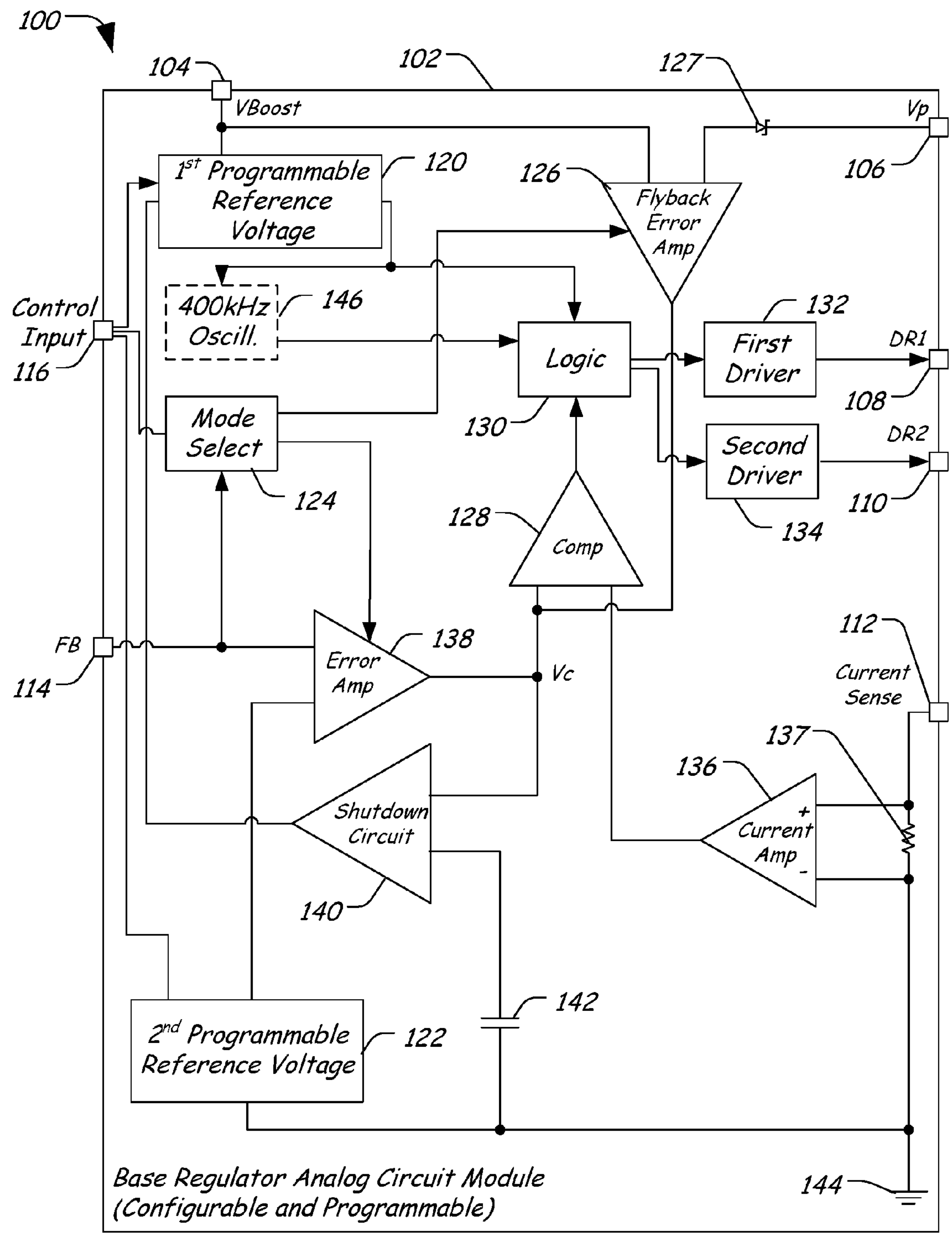
FIG. 1 is a diagram of a particular illustrative embodiment of a base regulator analog circuit module for use with selected circuitry to provide a parameterized voltage regulator.

FIG. 1 is a diagram of a particular illustrative embodiment of a circuit device 100 including a base regulator analog circuit module 102 for use with selected circuitry to provide a parameterized voltage regulator. The base regulator analog circuit module 102 includes a plurality of leads, including a voltage boost (VBoost) lead 104, a positive voltage (Vp) lead 106, a first driver (DR1) lead 108, a second driver (DR2) lead 110, a current sense (CS) lead 112, and a feedback (FB) lead 114. In general, the plurality of leads can be coupled to selected circuitry to provide a selected type of voltage regulator, such as a parameterized synchronous buck regulator, a parameterized buck regulator, a parameterized low dropout voltage regulator, a parameterized boost regulator, a parameterized buck boost regulator, other types of regulators, or any combination thereof. The base regulator analog circuit module 102 also includes a control input lead 116, which may be coupled to a control circuit, such as a processor or microprocessor, to receive control signals. In a particular example, a control circuit may provide one or more reference signals to the control input lead 116, which may be used as a reference signal, such as a programmable reference voltage. In a particular embodiment, the control circuit may provide one or more reference signals to a control pin of an integrated circuit that includes multiple base regulator analog circuit modules 102, each of which can be controlled by the control circuit.

The base regulator analog circuit module 102 includes a first programmable reference voltage 120 and a second programmable reference voltage 122, which are coupled to the control input lead 116. The base regulator analog circuit module 102 further includes a mode select module 124 that is adapted to control an operating mode of the base regulator analog circuit module 102 in response to control signals received via the control input 116. In a particular embodiment, the mode select module 124 can control a logic circuit 130 to cooperate with selected circuitry to provide a regulated power supply. The first programmable reference voltage 120 is coupled to the logic circuit 130, which is adapted to control a first driver 132 and a second driver 134 to selectively provide drive signals to the first and second drive leads 108 and 110. The first programmable reference voltage 120 may also be coupled to the voltage boost lead 104, which is provided as a first input to a flyback error amplifier 126.

In a particular embodiment, the flyback error amplifier 126 can be coupled to a switch associated with a transformer to adjust the ON-OFF duration of a switch so that the desired output voltage is maintained (thus keeping the output voltage regulated). The flyback error amplifier 126 includes a second input coupled to the positive voltage lead 106 via a breakdown diode 127, such as a zener diode. The flyback error amplifier 126 also includes a flyback error output that is coupled to a first input of a comparator 128, which is coupled to the logic circuit 130. Thus, the flyback error amplifier 126 provides inputs to the logic circuit 130 via the comparator 128 to control switches that are part of selected circuitry coupled to the base regulator analog circuit module 102.

The comparator 128 further includes a second input responsive to a current sense amplifier 136. The current sense amplifier 136 includes a first input coupled to the current sense lead 112 and a second input that is connected to a power supply terminal 144 and coupled to the current sense lead 112 via a sense resistor 137.

The base regulator analog circuit module 102 further includes an error amplifier 138 that includes a first input coupled to the feedback lead 114 and a second input coupled to the second programmable reference voltage 122. The error amplifier 138 further includes an output coupled to the first input of the comparator 128. The base regulator analog circuit module 102 also includes a shutdown circuit 140 that includes a first input coupled to the power supply terminal 144 via a capacitor 142 and a second input coupled to the first input of the comparator 128. The shutdown circuit 140 further includes an output that is coupled to the first programmable reference voltage 120 to turn off the reference voltage to the logic 130. The feedback lead 114 is also coupled to the mode select module 124 to provide feedback data to the mode select module 124. In a particular embodiment, the base regulator analog circuit module 102 can include an oscillator, such as a 400 kHz oscillator 146, which is coupled to the first programmable reference voltage 120 and to the logic circuit 130.

In general, the base regulator analog circuit module 102 uses the first programmable reference voltage 120 and the logic circuit 130 to drive the first driver 132, the second driver 134, or any combination thereof. The first driver 132 applies a drive signal to the first drive lead 108, which may be coupled to a control terminal of a switch to activate current flow through selected circuitry. Current is received at the current sense lead 112 and provided to a current sense amplifier 136, which measures the current across a sense resistor 137. Feedback from a power supply terminal is provided to the feedback lead 114. The feedback and the second programmable reference voltage 122 are provided as inputs to the error amplifier 138. The output of the current sense amplifier 136 and the output of the error amplifier 138 are provided to the comparator 128. The comparator output is provided to the logic circuit 130, which can use the comparator output to adjust the signal output of first driver 132, the second driver 134, or any combination thereof.

In a particular embodiment, the mode select module 124 may be used to configure the base regulator analog circuit module 102 to activate or deactivate components, such as the error amplifier, the flyback error amplifier, or any combination thereof. Further, the mode select module 124 can control the base regulator analog circuit module 102 to cooperate with selected circuitry to provide a particular type of regulator, such as a Buck regulator, a boost regulator, a low dropout regulator, a boost buck regulator, another type of regulator, or any combination thereof.

In a particular embodiment, the base regulator analog circuit module 102 is adapted to connect to selected circuitry via the plurality of leads to produce a type of voltage regulator and to receive at least one control signal via the control input 116 to configure the base regulator analog circuit module 102 to produce a desired output voltage. In a particular example, the control signal can be a reference signal, such as a reference current, a reference voltage, or any combination thereof. Further, the base regulator analog circuit module 102 can be programmed to provide an output voltage level within a range of voltages based on the first and second programmable voltage references 120 and 122. In a particular example, the base regulator analog circuit module 102 cooperates with selected circuitry to produce an output voltage at a precise voltage level within a range from approximately 5V to 0.5V.

Figure 2:
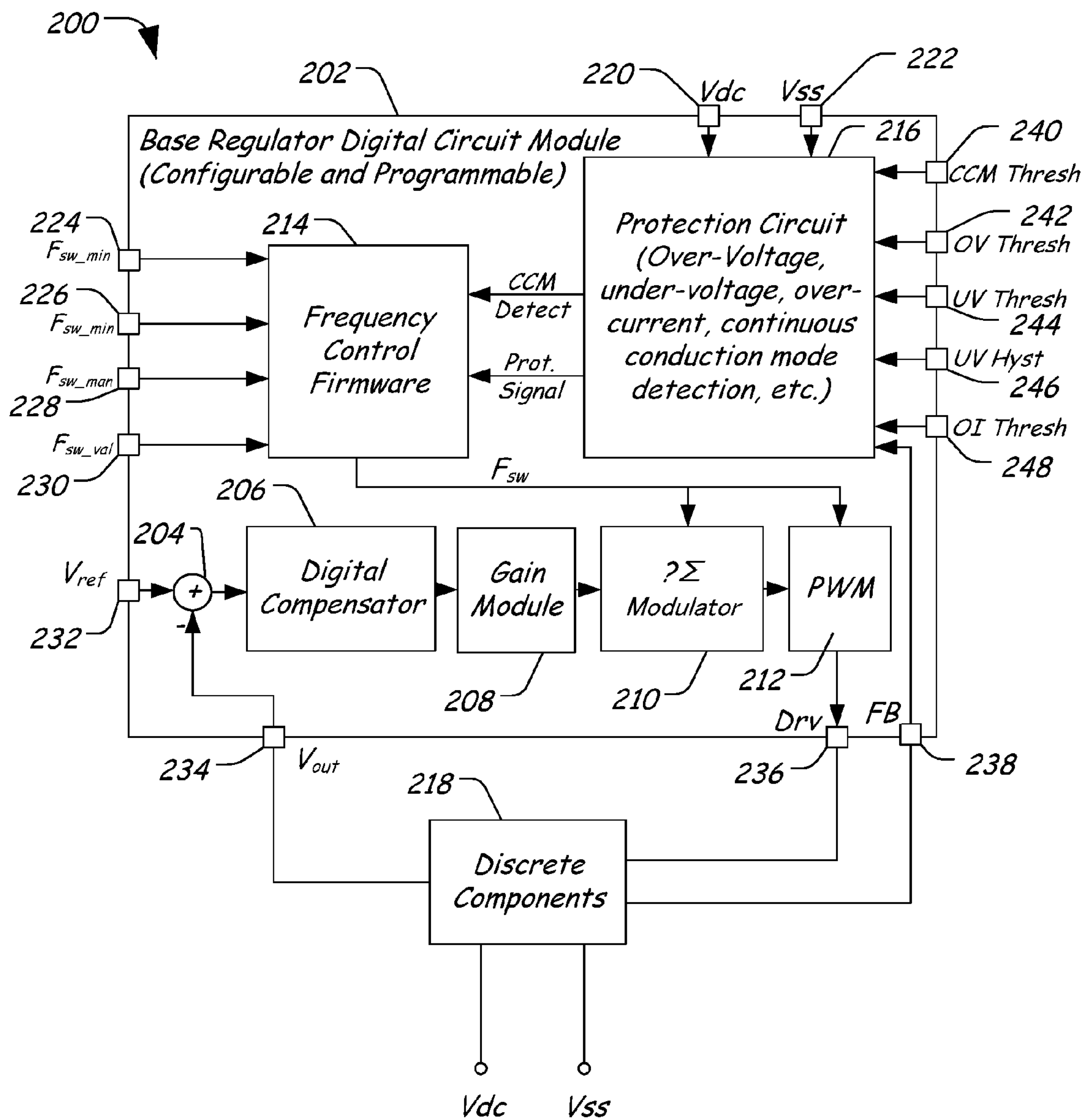
FIG. 2 is a diagram of a particular illustrative embodiment of a base regulator digital circuit module for use with selected circuitry to provide a parameterized voltage regulator.

FIG. 2 is a diagram of a particular illustrative embodiment of a base regulator digital circuit module 202 for use with selected circuitry (such as discrete circuit components 218) to provide a parameterized voltage regulator 200. The base regulator circuit module 202 includes a node 204 that is coupled to a voltage reference (Vref) pin (or lead) 232, such as the voltage boost (VBoost) pin 104 illustrated in FIG. 1. The node 204 is coupled to a digital compensator 206, which is coupled to a gain module 208. The digital compensator 206 can be used to compensate for greater than fifty percent (50%) duty cycle digital signals to provide stability even at high frequencies. The output of the gain module 208 is coupled to a sigma-delta (ΣΔ) modulator 210, which provides a modulated output to a pulse-width modulator (PWM) 212. The base regulator digital circuit module 202 further includes frequency control firmware 214 that is adapted to produce a frequency switching ($F_{sw}$) control signal to control the PWM 212 and the delta-sigma modulator 210. In a particular example, the frequency control firmware 214 is adapted to adjust a pulse width of a PWM signal or to adjust a PWM frequency. In another particular example, the frequency control firmware 214 can use a fixed on or fixed off configuration where a PWM frame width may be adjusted to compensate for the fixed PWM pulse width. Further, the base regulator digital circuit module 202 includes protection circuitry 216 to provide protection for over-voltage, under-voltage, over-current, over-voltage hysteresis, continuous conduction mode conditions, other power conditions, or any combination thereof.

The base regulator digital circuit module 202 further includes a plurality of pins or leads that can be used to configure (program) the module 202 to produce an output voltage at a precise voltage level and according to any number of voltage regulator configurations, including a flyback regulator, a buck regulator, a forward converter, or other configurations. In a particular example, the frequency control firmware 214 is programmable via frequency control inputs received via at least one of a minimum switching frequency (fsw_min) pin 224, a maximum switching frequency (fsw_max) pin 226, a switching frequency management (fsw_man) pin 228, and a switching frequency value (fsw_val) pin 230. Using the pins 224 and 226, a switching frequency range can be configured, and using the pins 228 and 230, the particular switching frequency can be programmed within the frequency range. Further, the mode of operation of the frequency control firmware 214 can be configured using the switching frequency management pin 228. As mentioned above, the frequency control firmware 214 is adapted to manage a PWM pulse width to provide a fixed on or fixed off period, to control a PWM frequency or frame rate, or any combination thereof.

Additionally, the protection circuit 216 is programmable via a continuous conduction mode (CCM) threshold pin 240 to receive a threshold setting related to a CCM operating mode where the current flow to the discrete components 218 is continuous. Further, the protection circuit 216 is programmable via an over-voltage threshold pin 242, an under-voltage threshold pin 244, an under-voltage hysteresis pin 246, and an over-current threshold pin 248. By programming the various thresholds via the pins 240, 242, 244, 246, and 248, the protection circuit 216 can be adjusted to work with different types of regulator configurations.

The base regulator digital circuit module 202 further includes a first voltage pin (Vdc) 220 (similar to the positive voltage (Vp) pin 106 illustrated in FIG. 1) and a second voltage pin (Vss) 222. Additionally, the base regulator digital circuit module 202 includes a voltage output (Vout) pin 234, a driver pin 236, and a feedback pin 238, which are coupled to one or more discrete components 218. The output voltage pin 234 is coupled to the node 234 to provide a voltage output feedback to the digital compensator 206. Further, the driver pin 236 is coupled to the PWM 212 to receive a PWM signal, and the feedback pin 238 is coupled to the protection circuit 216 to provide feedback to the protection circuit 216.

In general, the base regulator digital circuit module 202 can be coupled to a microprocessor, a field programmable gate array (FPGA) circuit, another type of processing circuit, or any combination thereof, via the pins 224, 226, 228, 230, 232, 240, 242, 244, 246, and 248. In a particular embodiment, input signals to the pins 224, 226, 228, and 230 can control the frequency control firmware 214 to dither a frequency control signal to spread an output power spectrum at the driver pin 236. In a particular example, the driver pin 238 may be coupled to a control terminal of a switch (such as a gate of a metal oxide semiconductor field effect transistor device), which may be integrated within the base regulator digital circuit module 202 or may be part of the discrete components 218.

In a particular example, the base regulator digital circuit module 202 provides multiple avenues for controlling the regulator output. For example, digital compensation can be used to provide current compensation for duty cycles that are greater than fifty (50) percent. Further, the frequency response and current thresholds can be altered by changing the control inputs. Further, the loop response can be adjusted to speed up for transients and to slow down for a steady state response. The base regulator digital circuit module 202 provides a large number of adjustable parameters to achieve a desired regulated output.

In a particular embodiment, the multiple adjustable parameters can include an over-voltage threshold parameter, an under-voltage threshold parameter, an over-current threshold parameter, other power parameters, or any combination thereof. In another particular embodiment, the multiple adjustable parameters can include a programmable dead-time control parameter to control an off-time during which switches of an h-bridge circuit are turned off. In another particular embodiment, the multiple adjustable parameters can include a delay time that is programmable to adjust a signaling delay related to switches of the h-bridge circuit. In another particular embodiment, the multiple adjustable parameters can include a fixed on or fixed off parameter that defines a fixed duration of an on-portion or an off-portion of a pulse-width modulated (PWM) pulse. In a particular example of a circuit that provides a low voltage, the fixed PWM pulse width may be used and the duration of the off-period of the PWM pulse may be adjusted such that a width of the PWM pulse defines the desired voltage. In another particular embodiment, the multiple adjustable parameters include a PWM frequency adjustment to modify a PWM frame rate or frequency. In still another embodiment, the multiple adjustable parameters can include a pulse positioning modulation (PWM) to vary a PWM frequency.

In general, for simplicity, the following discussion utilizes a base regulator analog circuit module 302, such as the base regulator circuit module 102 illustrated in FIG. 1, to show a variety of parameterized regulator configurations. However, it should be understood that the base regulator digital circuit module 202 may be used in lieu of the analog circuit module 102. In particular, the various configurations below may be implemented using either the base regulator analog circuit module 102 or the base regulator digital circuit module 202.

Figure 3:
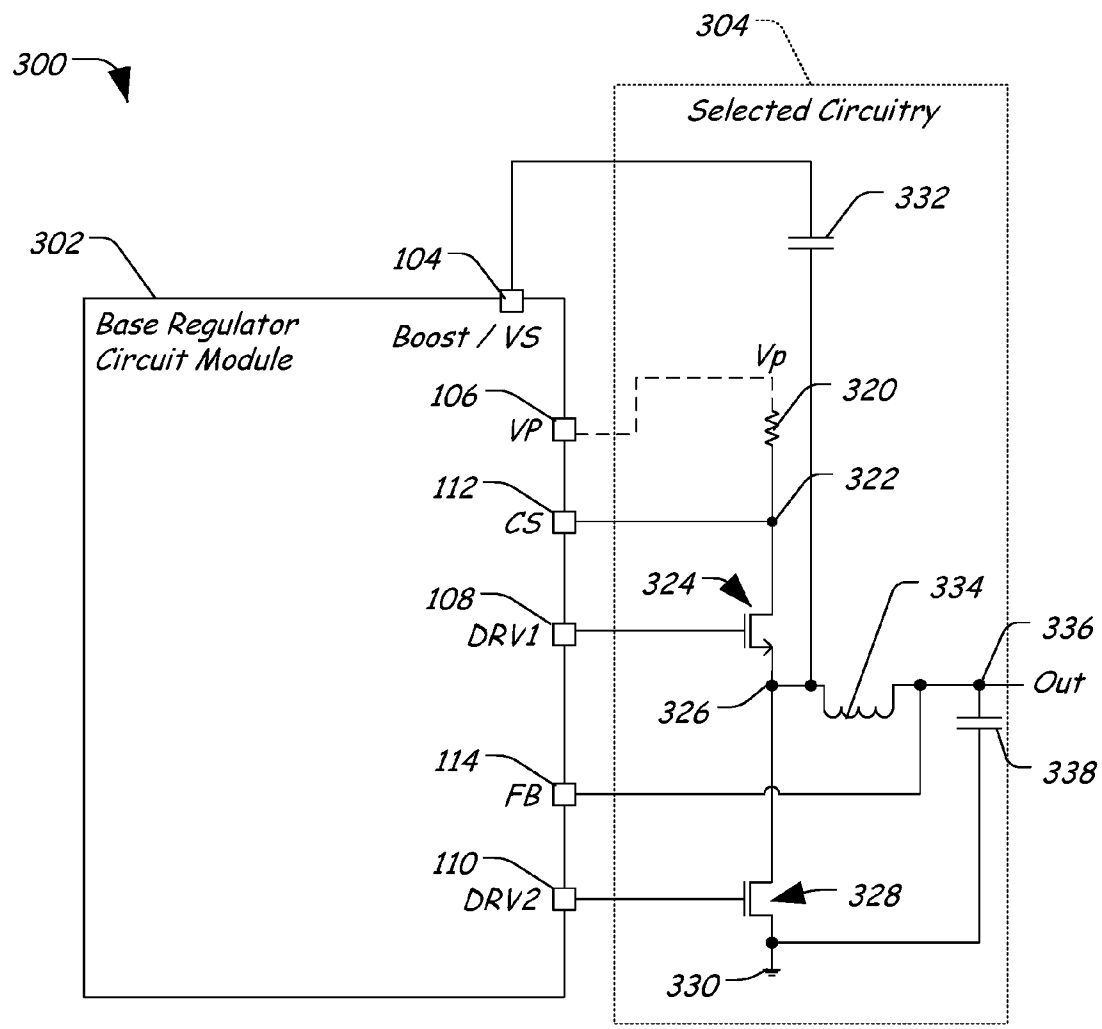
FIG. 3 is a diagram of a particular illustrative embodiment of a parameterized voltage regulator including a base regulator circuit module, such as the base regulator circuit modules of FIGS. 1 and 2.

FIG. 3 is a diagram of a particular illustrative embodiment of a parameterized voltage regulator 300 including a base regulator circuit module 302, such as the base regulator analog circuit module 102 of FIG. 1 or the base regulator digital circuit module 202 of FIG. 2. In general, the base regulator circuit module 302 is illustrated with the pins associated with the base regulator analog circuit module 102 for illustrative purposes only. It should be understood that either the analog or the digital versions of the base regulator circuit modules 102 or 202 of FIGS. 1 and 2 may be used, assuming associated changes to the pins to allow for the digital controls and to provide the relevant outputs for the particular implementation.

The base regulator circuit module 302 includes a plurality of leads, including a boost/voltage source (Boost/VS) lead 104, a positive voltage (Vp) lead 106, a first drive (DRV1) lead 108, a second drive (DRV2) lead 110, a current sense (CS) lead 112, and a feedback (FB) lead 114. The base regulator circuit module 302 is coupled to selected circuitry 304 to produce a parameterized synchronous buck regulator that takes an unregulated input voltage and produces a lower regulated output voltage.

The selected circuitry 304 includes a resistor 320 that is coupled to a positive voltage supply, which may be the positive voltage lead 106 of the base voltage regulator circuit module 302. The resistor 320 is also coupled to a current sense node 322, which is connected to the current sense lead 112. The selected circuitry 304 also includes a first switch 324 including a drain terminal that is coupled to the current sense node 322, a gate terminal that is coupled to the first driver lead 108, and a source terminal that is coupled to a switch node 326. The selected circuitry 304 also includes a second switch 328 including a drain terminal that is coupled to the switch node 326, a gate terminal that is coupled to the second driver lead 110, and a source terminal that is coupled to a power supply terminal 330. The selected circuitry 304 further includes a boost capacitor 332 that is coupled between the boost/voltage source lead 104 and the switch node 326. The selected circuitry 304 further includes an inductor 334 that is coupled between the switch node 326 and an output node 336. The selected circuitry 304 also includes a filter capacitor 338 that is coupled between the output node 336 and the power supply terminal 330.

It should be understood that, while the first and second switches 324 and 328 are illustrated as metal oxide semiconductor field effect transistors (MOSFETS), the first and second switches 324 and 328 can also be implemented as bipolar junction transistors (BJTs), insulated gate transistors, other types of switching devices, or any combination thereof.

In a particular embodiment, the first and second switches 324 and 328 are activated to allow current flow through the resistor 320. The current is received via the current sense lead 112. Further, a supply voltage is applied via the boost/voltage source lead 104 to the boost capacitor 332, which allows current to flow through the inductor 334 as the boost capacitor 332 is charging. The base regulator circuit module 302 may be programmed via a control signal, such as an external reference voltage, to apply a selected voltage to the boost/voltage source lead 104 and to the positive voltage lead 106. Further, the base regulator circuit module 302 may use a second programmable reference voltage to adjust an error amplifier output that is compared to the sensed current at the current sense lead 112 to adjust the signals applied to the first and second driver leads 108 and 110 by logic and driver circuits of the base regulator circuit module 302, thereby controlling the selected circuitry 304 to provide a desired regulated voltage level at the output node 336.

Figure 4:
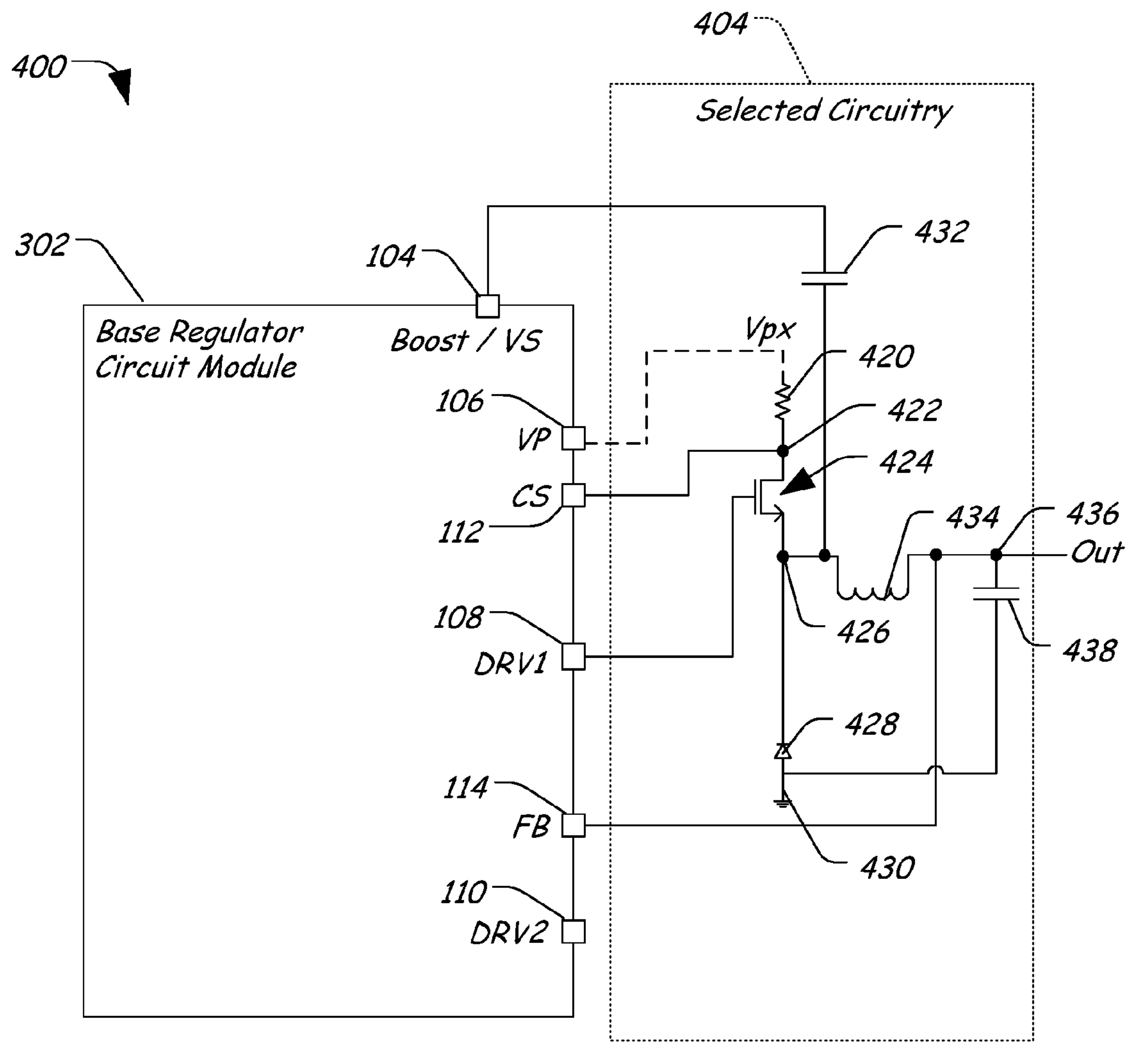
FIG. 4 is a diagram of a second particular illustrative embodiment of a parameterized voltage regulator including a base regulator circuit module, such as the base regulator circuit modules of FIGS. 1 and 2.

FIG. 4 is a diagram of a second particular illustrative embodiment of a parameterized voltage regulator 400 including a base regulator circuit module, such as the base regulator circuit module 302 of FIG. 3. The base regulator circuit module 302 includes a plurality of leads, including a boost/voltage source (Boost/VS) lead 104, a positive voltage (Vp) lead 106, a first drive (DRV1) lead 108, a second drive (DRV2) lead 110, a current sense (CS) lead 112, and a feedback (FB) lead 114. The base regulator circuit module 302 is coupled to selected circuitry 404 to produce a parameterized buck regulator that takes an unregulated input voltage and produces a lower regulated output voltage.

The selected circuitry 404 includes a resistor 420 that is coupled to a positive voltage supply, which may be the positive voltage lead 106 of the base voltage regulator circuit module 302. The resistor 420 is also coupled to a current sense node 422, which is connected to the current sense lead 112. The selected circuitry 404 also includes a switch 424 including a drain terminal that is coupled to the current sense node 422, a gate terminal that is coupled to the first driver lead 108, and a source terminal that is coupled to a switch node 426. In a particular embodiment, the switch 424 can be a bipolar junction transistor, an insulated gate bipolar transistor (IGBT), a p-channel or n-channel metal oxide semiconductor field effect transistor (MOSFET), another type of switch, or any combination thereof.

The selected circuitry 404 further includes a diode 428 including a cathode terminal coupled to the switch node 426 and an anode terminal coupled to a power supply terminal 430. The selected circuitry 404 also includes a boost capacitor 432 that is coupled between the boost/voltage source lead 104 and the switch node 426. The selected circuitry 404 further includes an inductor 434 that is coupled between the switch node 426 and an output node 436, which is connected to the feedback lead 114. The selected circuitry 404 also includes a filter capacitor 438 that is coupled between the output node 436 and the power supply terminal 430.

In a particular embodiment, the selected circuitry 404 cooperates with circuitry within the base regulator circuit module 302 to provide a parameterized buck voltage regulator having a desired voltage level at the output node 436. In a particular example, the output voltage level is detected at the feedback lead 114 and a current is sensed via the current sense lead 112. The sensed information is provided to a current sense amplifier (such as the current sense amplifier 136 illustrated in FIG. 1) and to an error amplifier (such as the error amplifier 138 illustrated in FIG. 1). The base regulator circuit module 302 can utilize the sensed information to adjust control signals applied to the first and second driver leads 108 and 110, which can control current flow via the first and second switches 424 and 428. In a particular embodiment, when the parameterized voltage regulator 400 is switched off, the voltage at the output node 436 may be floating or can be discharged to the power supply terminal 430 by deactivating the first switch 424 and by activating the second switch 428. Alternatively, the output node 436 may be discharged through the feedback lead 114.

Figure 5:
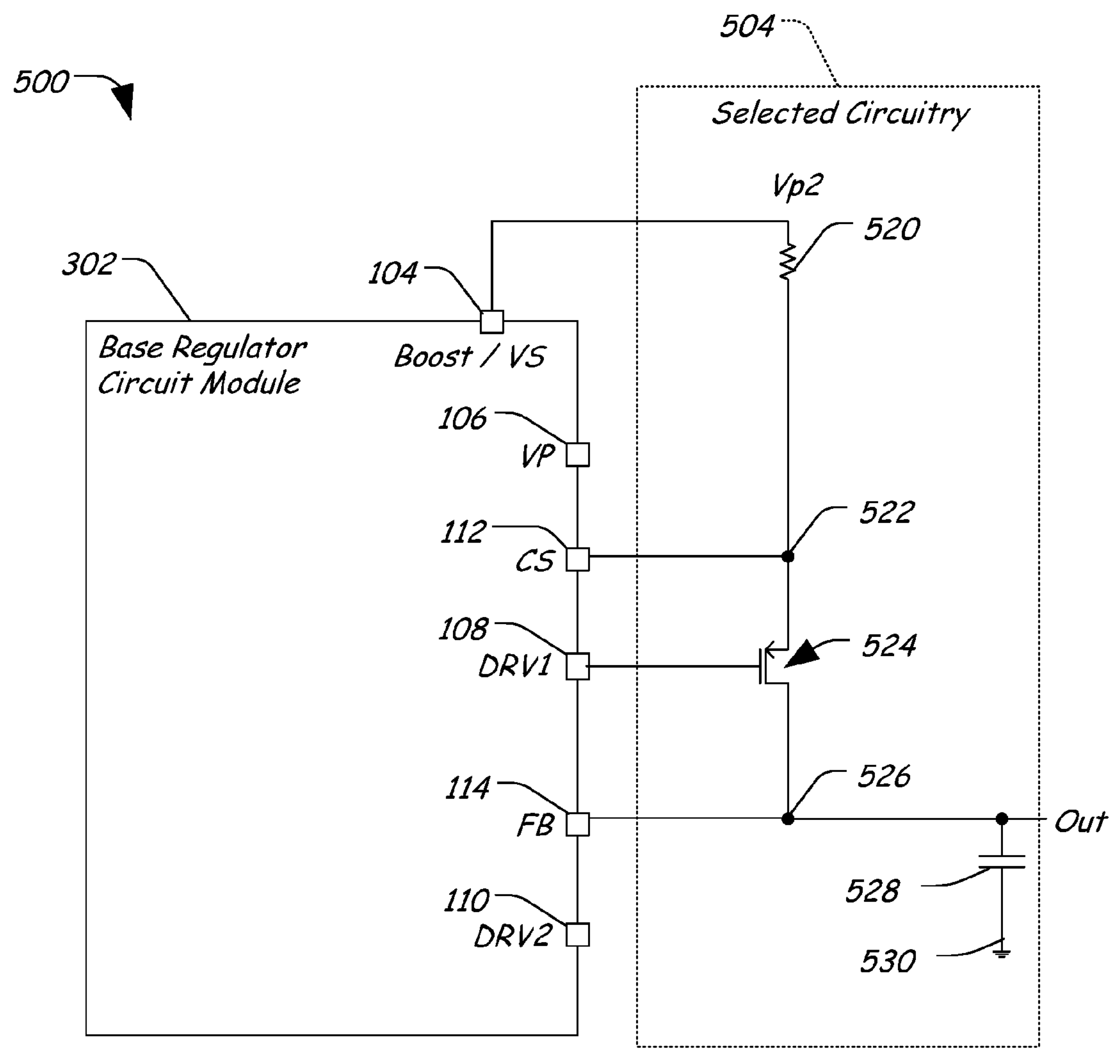
FIG. 5 is a diagram of a third particular illustrative embodiment of a parameterized voltage regulator including a base regulator circuit module, such as the base regulator circuit modules of FIGS. 1 and 2.

FIG. 5 is a diagram of a third particular illustrative embodiment of a parameterized voltage regulator 500 including a base regulator circuit module, such as the base regulator circuit module 302 of FIG. 3. The base regulator circuit module 302 includes a plurality of leads, including a boost/voltage source (Boost/VS) lead 104, a positive voltage (Vp) lead 106, a first drive (DRV1) lead 108, a second drive (DRV2) lead 110, a current sense (CS) lead 112, and a feedback (FB) lead 114. The base regulator circuit module 302 is coupled to selected circuitry 504 to produce a parameterized low drop out voltage regulator that takes an unregulated input voltage and produces a lower regulated output voltage with reduced power dissipation.

The selected circuitry 504 includes a resistor 520 that is coupled to the boost voltage lead 104 and to a current sense node 522, which is coupled to the current sense lead 112. The selected circuitry 504 also has a switch 524 that includes a source terminal coupled to the current sense node 522, a gate terminal coupled to the first driver lead 108, and a drain terminal that is coupled to an output node 526, which is coupled to the feedback lead 114. A filter capacitor 528 is coupled between the output node 526 and a power supply terminal 530. In a particular embodiment, the switch 524 can be a bipolar junction transistor, an insulated gate bipolar transistor (IGBT), a p-channel or n-channel metal oxide semiconductor field effect transistor (MOSFET), another type of switch, or any combination thereof.

In a particular embodiment, the base regulator circuit module 302 applies a positive voltage to the resistor 520 and applies an activation signal to the first driver lead 108 to selectively activate the switch 524 to allow current flow to the output node 526. The current is sensed at the current sense node 522 via circuitry within the base regulator circuit module 302 that is coupled to the current sense lead 112 and the voltage and current at the output node 526 can be sensed via the feedback lead 114. The base regulator circuit module 302 can use the sensed current and the output voltage/current to control a voltage level at the output node 526.

Figure 6:
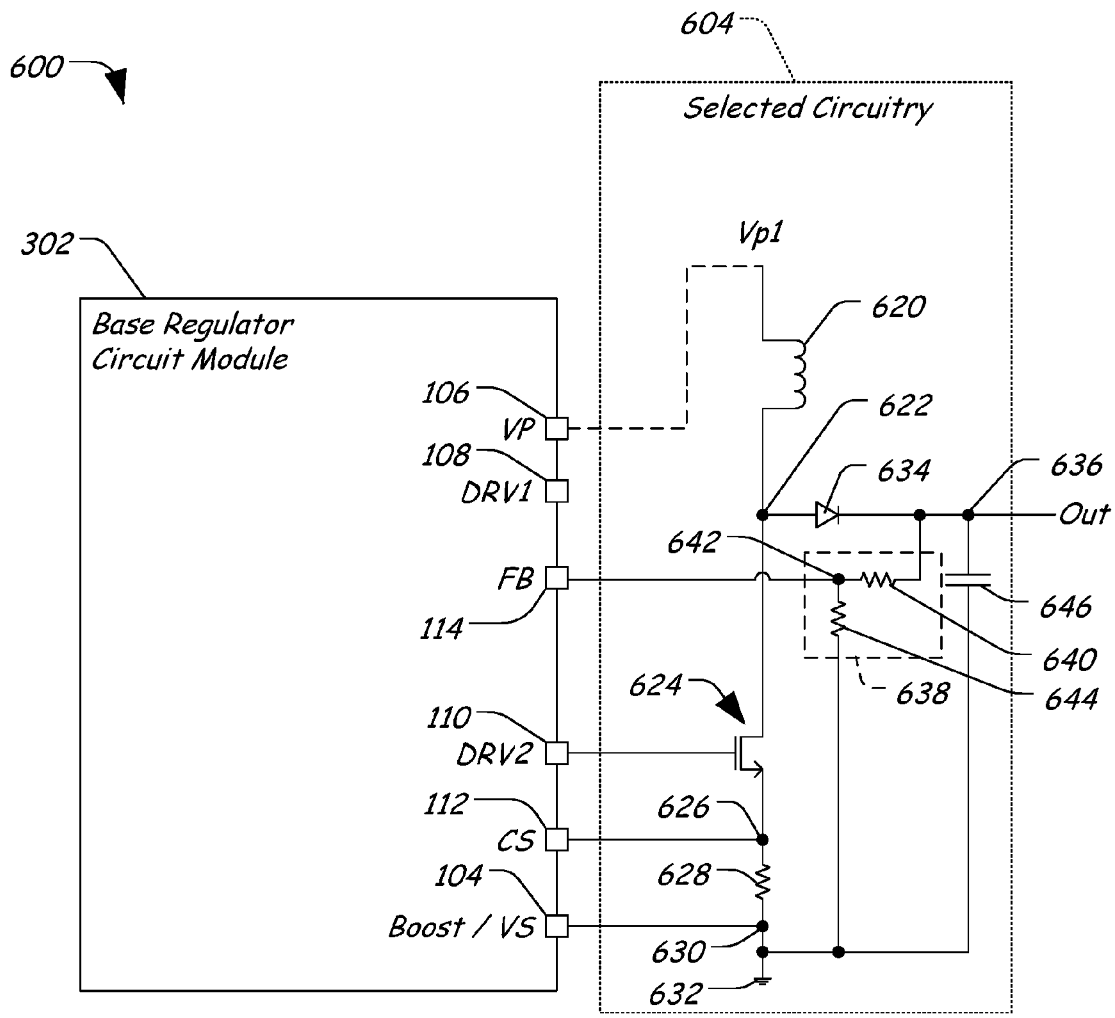
FIG. 6 is a diagram of a fourth particular illustrative embodiment of a parameterized voltage regulator including a base regulator circuit module, such as the base regulator circuit modules of FIGS. 1 and 2.

FIG. 6 is a diagram of a fourth particular illustrative embodiment of a parameterized voltage regulator 600 including a base regulator circuit module, such as the base regulator circuit module 302 of FIG. 3. The base regulator circuit module 302 includes a plurality of leads, including a boost/voltage source (Boost/VS) lead 104, a positive voltage (Vp) lead 106, a first drive (DRV1) lead 108, a second drive (DRV2) lead 110, a current sense (CS) lead 112, and a feedback (FB) lead 114. The base regulator circuit module 302 is coupled to selected circuitry 604 to produce a parameterized boost regulator that takes an unregulated input voltage and produces a regulated output voltage.

The selected circuitry 604 includes an inductor 620 that is coupled between the positive voltage lead 106 and a switched node 622. The selected circuitry 604 further includes a switch 624 that includes a drain terminal coupled to the switched node 622, a gate terminal coupled to the second driver lead 110, and a source terminal coupled to a current sense node 626, which is connected to the current sense lead 112. In a particular embodiment, the switch 624 can be a bipolar junction transistor, an insulated gate bipolar transistor (IGBT), a p-channel or n-channel metal oxide semiconductor field effect transistor (MOSFET), another type of switch, or any combination thereof.

The selected circuitry 604 also includes a resistor 628 that is coupled between the current sense node 626 and a boost voltage node 630, which is coupled to the boost voltage lead 104. The boost voltage node 630 is also coupled to a power supply terminal 632. The selected circuitry 604 also includes a diode 634 that has an anode terminal coupled to the switched node 622 and a cathode terminal coupled to an output node 636. A voltage divider circuit 638 is coupled between the output node 636 and the feedback lead 114. The voltage divider circuit 638 includes a first resistor 640 that is coupled between the output node 636 and a voltage divider node 642, which is connected to the feedback lead 114. The voltage divider circuit 638 also includes a second resistor 644 that is coupled between the voltage divider node 642 and the power supply terminal 632. A filter capacitor 646 is coupled between the output node 636 and the power supply terminal 632.

In a particular embodiment, the base regulator circuit module 302 activates the switch 624 via the second driver lead 110 to allow current flow through the inductor 620, which drives current to the output node 636 via the diode 634. The feedback lead 114 receives a voltage level via the voltage divider circuit 638, and the base regulator circuit module 302 is adapted to adjust a signal applied to the second driver lead 110 to control current flow through the switch 624 and through the inductor 620.

Figure 7:
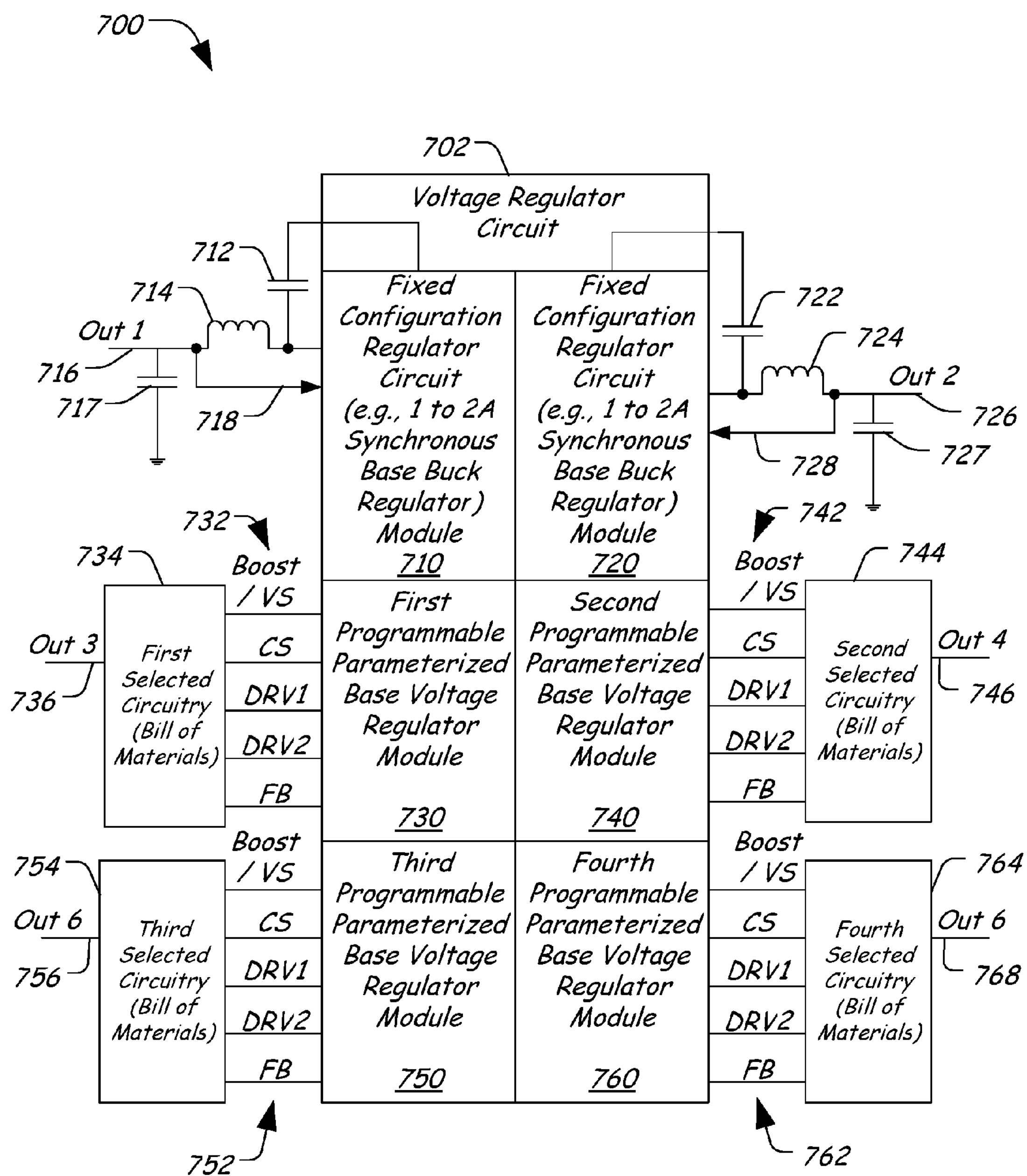
FIG. 7 is a diagram of a particular illustrative embodiment of a power regulator circuit including multiple parameterized voltage regulators.

FIG. 7 is a diagram of a particular illustrative embodiment of a power regulator circuit 700 including multiple parameterized voltage regulators. The power regulator circuit 700 includes a first fixed configuration regulator module 710 and a second fixed configuration regulator module 720. The power regulator circuit 700 also includes a plurality of base regulator modules including a first programmable parameterized base voltage regulator module 730, a second programmable parameterized base voltage regulator module 740, a third programmable parameterized base voltage regulator module 750, and a fourth programmable parameterized base voltage regulator module 760. In a particular embodiment, the first and second fixed configuration regulator modules 710 and 720 and the first, second, third, and fourth programmable parameterized base voltage regulator modules 730, 740, 750, and 760 can be formed in a single circuit package 702. In another particular embodiment, the first and second fixed configuration regulator modules 710 and 720 and the first, second, third, and fourth programmable parameterized base voltage regulator modules 730, 740, 750, and 760 can be formed on multiple integrated circuits within a single package.

In general, the first fixed configuration regulator module 710 can be configured as a synchronous base buck regulator that is coupled to selected circuitry to provide a first synchronous 1 to 2A buck regulator. The selected circuitry includes a first capacitor 712 coupled to the first fixed configuration regulator module 710 and to a first output 716 via an inductor 714. The selected circuitry also includes a filter capacitor 717 that is coupled between the first output 716 and a power supply terminal. The selected circuitry further includes a feedback loop 718 that is coupled between the first output 716 and the first fixed configuration regulator module 710. The first fixed configuration regulator module 710 is coupled to the selected circuitry to provide a first output voltage at the first output 716.

The second fixed configuration regulator module 720 can be configured as a synchronous base buck regulator that is coupled to selected circuitry to provide a second synchronous 1 to 2A buck regulator. The selected circuitry includes a second capacitor 722 coupled to the second fixed configuration regulator module 720 and to a second output 726 via an inductor 724. The selected circuitry also includes a filter capacitor 727 that is coupled between the second output 726 and a power supply terminal. The selected circuitry further includes a feedback loop 728 that is coupled between the second output 726 and the second fixed configuration regulator module 720. The second fixed configuration regulator module 720 is coupled to the selected circuitry to provide a second output voltage at the second output 726.

The first programmable parameterized base voltage regulator module 730 includes a plurality of leads 732, such as the plurality of leads 104, 106, 108, 110, 112, and 114 illustrated in FIGS. 1-6, including a boost voltage lead (Boost/VS), a current sense (CS) lead, a first driver (DRV1) lead, a second driver (DRV2) lead, and a feedback (FB) lead. In a particular embodiment, the first programmable parameterized base voltage regulator module 730 also includes a positive voltage lead. The first programmable parameterized base voltage regulator module 730 is also coupled to first selected circuitry (bill of materials) 734 via the plurality of leads 732. The selected circuitry 734 cooperates with the first programmable parameterized base voltage regulator module 730 to provide a third regulated output voltage at a third output 736.

The second programmable parameterized base voltage regulator module 740 includes a plurality of leads 742, such as the plurality of leads 104, 106, 108, 110, 112, and 114 illustrated in FIGS. 1-5, including a boost voltage lead (Boost/VS), a current sense (CS) lead, a first driver (DRV1) lead, a second driver (DRV2) lead, and a feedback (FB) lead. In a particular embodiment, the second programmable parameterized base voltage regulator module 740 also includes a positive voltage lead. The second programmable parameterized base voltage regulator module 740 is also coupled to second selected circuitry (bill of materials) 744 via the plurality of leads 742. The selected circuitry 744 cooperates with the second programmable parameterized base voltage regulator module 740 to provide a fourth regulated output voltage at a fourth output 746.

The third programmable parameterized base voltage regulator module 750 includes a plurality of leads 752, such as the plurality of leads 104, 106, 108, 110, 112, and 114 illustrated in FIGS. 1-5, including a boost voltage lead (Boost/VS), a current sense (CS) lead, a first driver (DRV1) lead, a second driver (DRV2) lead, and a feedback (FB) lead. In a particular embodiment, the third programmable parameterized base voltage regulator module 750 also includes a positive voltage lead. The third programmable parameterized base voltage regulator module 750 is also coupled to third selected circuitry (bill of materials) 754 via the plurality of leads 752. The selected circuitry 754 cooperates with the third programmable parameterized base voltage regulator module 750 to provide a fifth regulated output voltage at a fifth output 756.

The fourth programmable parameterized base voltage regulator module 760 includes a plurality of leads 762, such as the plurality of leads 104, 106, 108, 110, 112, and 114 illustrated in FIGS. 1-6, including a boost voltage lead (Boost/VS), a current sense (CS) lead, a first driver (DRV1) lead, a second driver (DRV2) lead, and a feedback (FB) lead. In a particular embodiment, the fourth programmable parameterized base voltage regulator module 760 also includes a positive voltage lead. The fourth programmable parameterized base voltage regulator module 760 is also coupled to fourth selected circuitry (bill of materials) 764 via the plurality of leads 762. The selected circuitry 764 cooperates with the fourth programmable parameterized base voltage regulator module 760 to provide a sixth regulated output voltage at a sixth output 768.

In a particular embodiment, each of the first and second regulator modules 710 and 720 can be fixed to provide a pre-determined power supply at the first second outputs 716 and 726, respectively. In an alternative embodiment, the first and second regulator modules 710 and 720 are configurable and programmable to provide regulated power supplies at the first and second outputs 716 and 726, respectively. In a particular embodiment, the power supplies at the first and second outputs 716 and 726 may be within a range from approximately 1 to 2 mA and at a predetermined voltage level, such as 5V. The first, second, third, and fourth programmable parameterized base voltage regulator modules 730, 740, 750, and 760 are programmable and configurable to cooperated with the first, second, third, and fourth selected circuitry 734, 744, 754, and 764 to provide independent, regulated power supplies at the third, fourth, fifth, and sixth outputs 736, 746, 756, and 768. Further, in a particular example, the first, second, third and fourth selected circuitry 734, 744, 754, and 764 can be selected to cooperate with the first, second, third, and fourth programmable parameterized base voltage regulator modules 730, 740, 750, and 760 to provide particular types of voltage regulators.

In a particular example, the first programmable parameterized base voltage regulator module 730 cooperates with the first selected circuitry 734 to provide a parameterized synchronous buck voltage regulator. The second programmable parameterized base voltage regulator module 740 cooperates with the second selected circuitry 744 to provide a parameterized low voltage dropout (LDO) regulator. The third programmable parameterized base voltage regulator module 750 cooperates with the third selected circuitry 754 to provide a parameterized boost regulator. The fourth programmable parameterized base voltage regulator module 760 cooperates with the fourth selected circuitry 764 to provide a parameterized buck voltage regulator. Thus, the voltage regulator circuit 700 includes multiple parameterized, programmable voltage regulator circuits that can be programmed and configured to provide independent power supplies at selected power levels using a selected type of voltage regulator circuit.

It should be understood that, while only six base voltage regulator modules are shown, the voltage regulator circuit 700 can include any number of base voltage regulator modules, depending on the particular implementation. Moreover, since the base voltage regulator modules can formed within a single package 702, loading on a primary isolated supply can be controlled. For example, by controlling a power on sequence for the multiple base voltage regulator modules, power supply noise can be reduced. Further, by controlling the power on sequence, power spiking on start up can also be controlled. Additionally, frequency dithering may be used to distribute the regulated supply frequencies across a spectrum to reduce frequency related noise, such as electromagnetic interference (EMI).

In general, it should be understood that the first and second synchronous base buck regulator modules 710 and 720 and the first, second, third, and fourth programmable parameterized base voltage regulator modules 730, 740, 750, and 760 can be configured and programmed under control of a programmable technology, such as a flash memory, a one-time programmable (OTP) memory, a fuse, another programmable technology, or any combination thereof. Further, in another particular embodiment, the first and second fixed configuration regulator modules 710 and 720 can be controlled by a control module or processor (microprocessor). Additionally, the first, second, third, and fourth programmable parameterized base voltage regulator modules 730, 740, 750, and 760 can be programmed by a control module or processor via a control input lead.

In a particular illustrative embodiment, each of the first, second, third, and fourth programmable parameterized base voltage regulator modules 730, 740, 750, and 760 is configurable and programmable to support a synchronous buck regulator with two external transistor devices, such as n-channel field effect transistors (FETs), and a boost capacitor. Further, the regulator can be reconfigured to work with other regulator configurations, such as a buck regulator with a diode instead of a synchronous rectifier, a low drop out regulator, a boost regulator, an inverting regulator, other regulators, or any combination thereof.

In a particular embodiment, the first and second fixed configuration regulator modules 710 and 720 and the first, second, third, and fourth programmable parameterized base voltage regulator modules 730, 740, 750, and 760 include multiple programmable characteristics for each regulator, including a programmable output voltage having a relatively high level of accuracy, a programmable output current limit, a programmable output frequency, other programmable characteristics, or any combination thereof. Further, by including the first and second fixed configuration regulator modules 710 and 720 and the first, second, third, and fourth programmable parameterized base voltage regulator modules 730, 740, 750, and 760 in a single circuit package 702, the switching frequency or frequencies can be programmed to provide variable switching frequencies. Further, the regulator turn on points can be coordinated to reduce loading on a primary supply. Moreover, the turn on sequence of the various modules 710, 720, 730, 740, 750, and 760 can be controlled to reduce supply noise.

Generally, each of the first and second fixed configuration regulator modules 710 and 720 and the first, second, third, and fourth programmable parameterized base voltage regulator modules 730, 740, 750, and 760 occupies a small circuit area. In a particular example, the circuit area of each moudle may be approximately 0.2 $mm^2$ to 0.5 $mm^2$. Further, a single die can be used in multiple packages to provide any number of regulated output voltages. For example, a circuit package with 28 pins can include four (4) independent regulators. In another example, a circuit package with thirty-two (32) pins can include five (5) independent voltage regulators, and a circuit package with forty (40) pins can include six (6) independent voltage regulators. The voltage regulator 700 illustrated in FIG. 7 has forty (40) pins (or leads). In a particular embodiment, multiple integrated circuits can be included within a single package. Alternatively, each of the modules can be produced on a single substrate.

In a particular example, the base voltage regulator module can be a reusable module to support various voltage regulator types and to provide various output voltages. Further, the base voltage regulator module can be used within a power circuit for a power over Ethernet (PoE) enabled device, such as a powered device that receives both power and data from a common cable. In addition, by using a modular approach and by integrating multiple base voltage regulator modules on a single circuit, factory calibrations and optimizations can be used to enhance performance.

Figure 8:
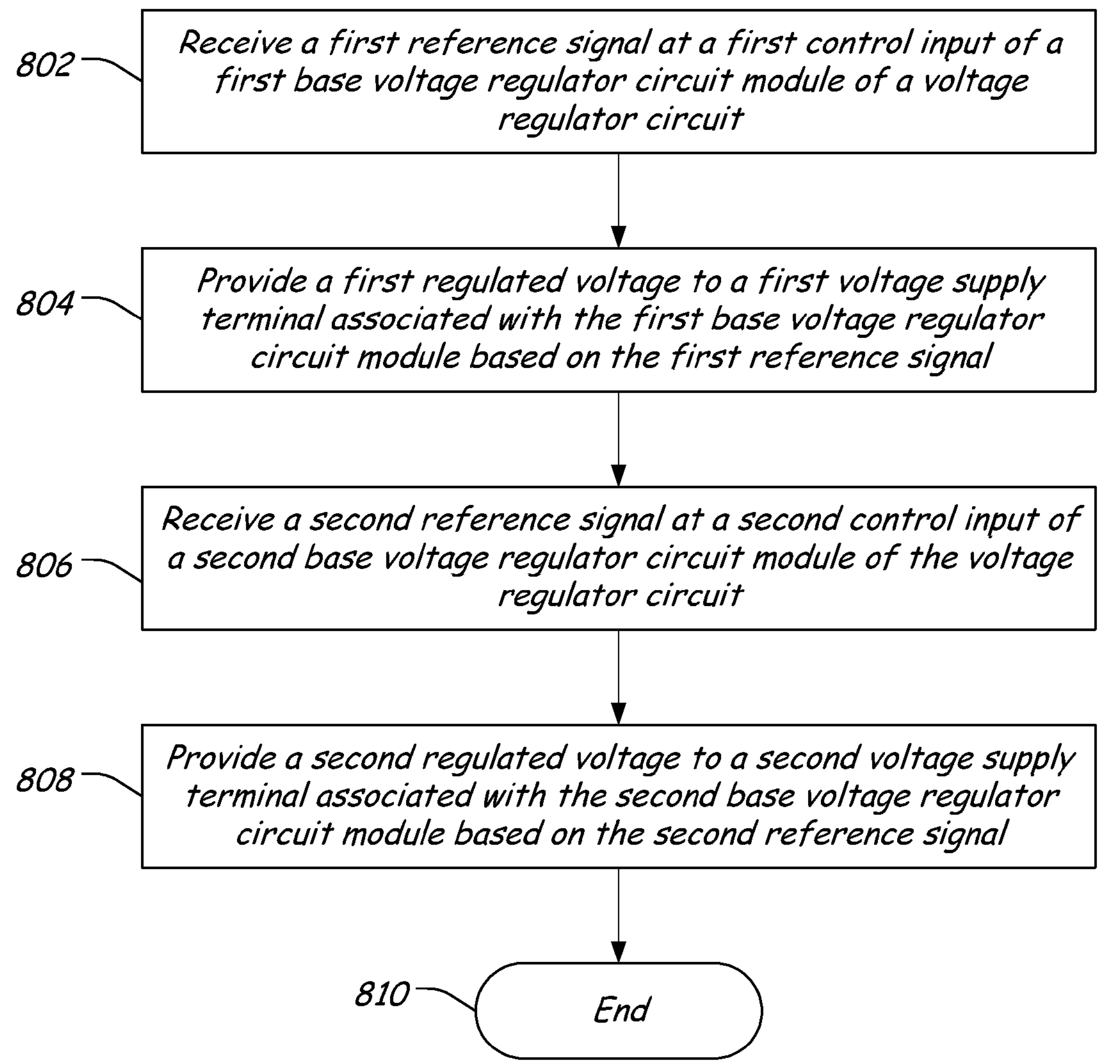
FIG. 8 is a flow diagram of a particular illustrative embodiment of a method of providing multiple power supplies using a power regulator circuit including multiple parameterized voltage regulators.

FIG. 8 is a flow diagram of a particular illustrative embodiment of a method of providing multiple power supplies using a power regulator circuit including multiple parameterized voltage regulators. At 802, a first reference signal is received at a first control input of a first base voltage regulator circuit module of a voltage regulator circuit. Moving to 804, a first regulated voltage is provided to a first voltage supply terminal associated with the first base voltage regulator circuit based on the first reference signal. Continuing to 806, a second reference signal is received at a second control input of a second base voltage regulator circuit module of the voltage regulator circuit. Proceeding to 808, a second regulated voltage is provided to a second voltage supply terminal associated with the second base voltage regulator circuit module based on the second reference signal. The method terminates at 810.

In a particular embodiment, the power regulator circuit can include any number of parameterized voltage regulators that are adapted to provide multiple, different, independent regulated power supplies. In a particular example, the power regulator circuit includes at least six regulator modules to provide six programmable power supplies for providing power to multiple circuits.

Figure 9:
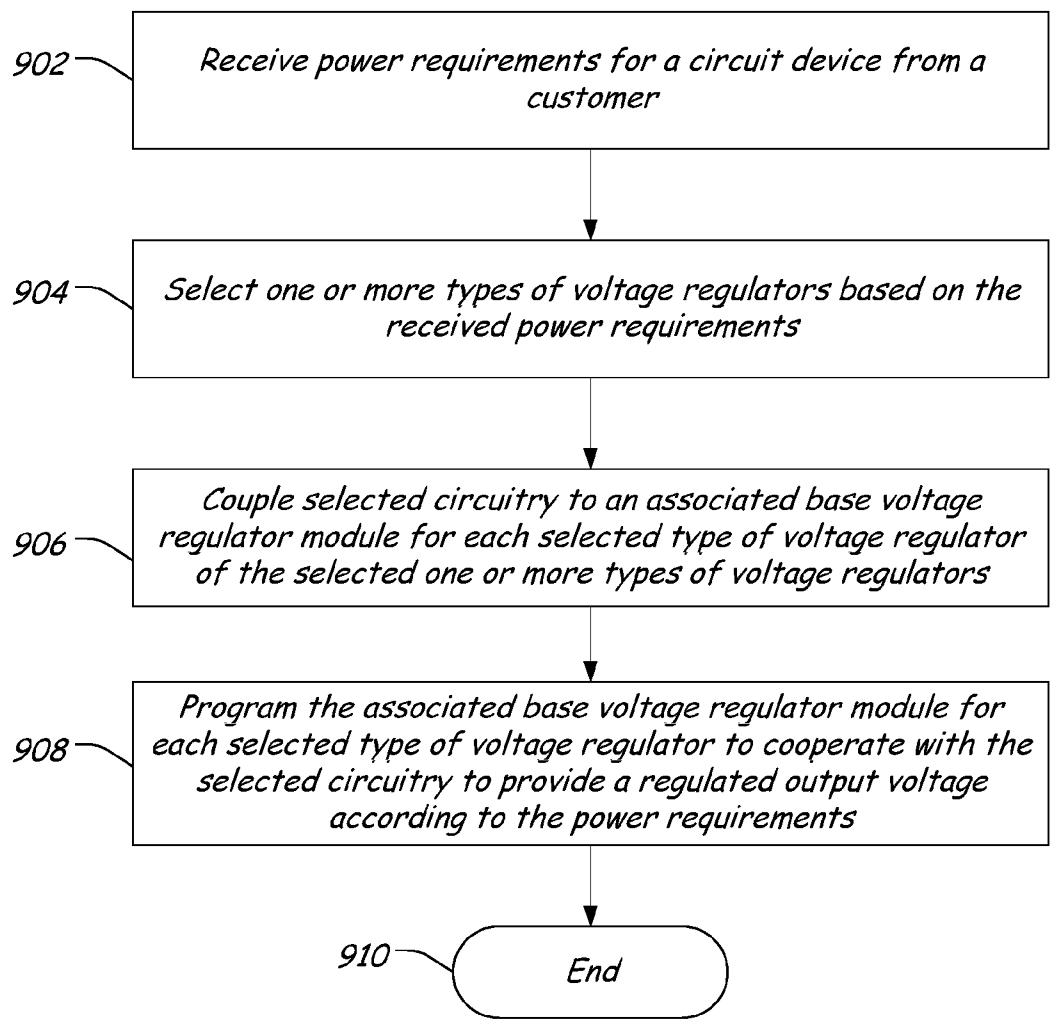
FIG. 9 is a flow diagram of a second particular illustrative embodiment of a method of providing multiple power supplies using a power regulator circuit including multiple parameterized voltage regulators.

FIG. 9 is a flow diagram of a second particular illustrative embodiment of a method of providing multiple power supplies using a power regulator circuit including multiple parameterized voltage regulators. At 902, power requirements for a circuit are received from a customer. Moving to 904, one o more types of voltage regulators are selected based on the received power requirements. Advancing to 906, selected circuitry is coupled to an associated base voltage regulator module for each selected type of voltage regulator of the selected one or more types of voltage regulators. Continuing to 908, the associated base voltage regulator module for each selected type of voltage regulator is programmed to cooperate with the selected circuitry to provide a regulated output voltage according to the power requirements. The method terminates at 910.

In conjunction with the circuit devices and methods disclosed above, a base regulator (digital or analog) circuit module is disclosed that includes multiple configurable parameters, which may be programmed by applying control signals and/or selected signals to pins of the base regulator circuit module to achieve desired protections and to produce a regulated output voltage. In general, with respect to a digital regulator circuit module, multiple parameters can be programmed, including switching frequency parameters (e.g., minimum and maximum switching frequencies, a switching frequency value and a switching frequency control), a reference voltage, voltage protection thresholds (e.g., over-voltage, over-current, under-voltage, under-voltage hysteresis, and continuous current mode thresholds), other parameters, or any combination thereof. With respect to an analog regulator circuit module, the multiple configurable parameters can include a mode selection, a reference voltage, a feedback parameter, a voltage boost parameter, other parameters, or any combination thereof. In both the digital and analog regulator circuit modules, the configurable parameters can be adjusted to program the base regulator module to operate in conjunction with other circuitry to produce a desired regulated output voltage.

In general, by providing multiple control input pins and multiple configurable parameters, a base regulator circuit module can be reused with multiple different configurations to supply various voltage levels by simply adjusting particular configurable parameters. A particular benefit provided by the configurable regulator circuit modules is that circuit modules can be reused in different devices without a need for redesigning the particular circuitry. Further, the configurable regulator circuit modules can be combined in a single integrated circuit or into a single circuit package, which can be controlled by a common controller to provide multiple power outputs. Further, since the circuits can be included in a single package, the common controller can control a power on sequence, which can reduce power consumption and enhance performance, including reducing downstream current or voltage spikes.

Although the present invention has been described with reference to preferred embodiments, workers skilled in the art will recognize that changes may be made in form and detail without departing from the spirit and scope of the invention.

What is claimed is:

1. A circuit device comprising:

a plurality of programmable voltage regulator circuits adapted to produce one or more unique power supplies, each programmable voltage regulator circuit comprising:

a power supply output terminal;

a base regulator circuit module that is configurable to adjust multiple parameters to support a plurality of regulator configurations, the base regulator circuit module comprising a plurality of leads; and selected circuitry coupled to the plurality of leads and to the power supply output terminal, the selected circuitry adapted to cooperate with the base regulator circuit module to provide a selected type of regulator circuit and to apply a power supply to the power supply output terminal.

2. The circuit device of claim 1, wherein the multiple parameters include a programmable output voltage, a programmable output current limit, a programmable switching frequency, or any combination thereof.

3. The circuit device of claim 1, wherein the multiple parameters comprise an over-voltage threshold, an under-voltage threshold, and an over-current threshold.

4. The circuit device of claim 1, wherein the multiple parameters include a programmable dead time control parameter.

5. The circuit device of claim 1, wherein the multiple parameters include a fixed PWM pulse on time or off time parameter.

6. The circuit device of claim 1, wherein the multiple parameters include a pulse-width modulated (PWM) adjustment parameter to adjust at least one of a PWM frame repetition rate, a PWM frequency, and a PWM duty cycle.

7. The circuit device of claim 1, wherein the multiple parameters include a pulse positioning modulation (PPM) parameter to adjust at least one of a pulse position within a pulse width modulated (PWM) frame and a PWM frequency.

8. The circuit device of claim 1, wherein the base regulator circuit of each regulator circuit of the plurality of programmable voltage regulator circuits is programmed to support the selected type of regulator circuit, and wherein the selected type of regulator circuit comprises one of a parameterized boost regulator, a parameterized low dropout regulator, a parameterized synchronous buck regulator, a parameterized buck regulator, and a parameterized buck boost regulator.

9. The circuit device of claim 1, wherein each regulator circuit of the plurality of programmable voltage regulator circuits is independently configurable and programmable.

10. The circuit device of claim 1, wherein the base regulator circuit module comprises a base regulator analog circuit module.

11. The circuit device of claim 1, wherein the base regulator circuit module comprises a base regulator digital circuit module.

12. The circuit device of claim 1, wherein the plurality of voltage regulators include at least one circuit substrate in a single package.

13. The circuit device of claim 12, wherein the single package includes at least one control input responsive to a programmable technology and coupled to each of the plurality of programmable voltage regulator circuits to selectively configure at least one of the plurality of programmable voltage regulator circuits to provide a programmable output voltage.

14. The circuit device of claim 13, wherein the programmable technology comprises a control circuit and wherein the control circuit is adapted to apply an external reference signal to the at least one control input, the external reference signal for use by one or more of the programmable voltage regulator circuits.

15. The circuit device of claim 13, wherein the programmable technology is adapted to control a power on sequence associated with the plurality of programmable voltage regulator circuits.

16. A circuit device comprising:

- a first fixed configuration regulator circuit including a first output to provide a first power supply;
- a second fixed configuration regulator circuit including a second output to provide a second power supply; and
- one or more programmable parameterized regulator circuits, each of the one or more programmable parameterized regulator circuits including a power supply output to carry a unique power supply, each of the one or more programmable parameterized regulator circuits comprising:
  - a base regulator circuit module having multiple configurable parameters to support a plurality of regulator configurations, the base regulator circuit module comprising a plurality of leads; and
  - selected circuitry coupled to the plurality of leads and adapted to cooperate with the base regulator circuit module to provide a selected type of regulator circuit to provide a desired power supply to the power supply output.

17. The circuit device of claim 16, wherein the first and second fixed configuration regulator circuits comprise buck regulator circuits.

18. The circuit device of claim 16, wherein the one or more programmable parameterized regulator circuits are adapted to support multiple types of regulator circuits concurrently.

19. The circuit device of claim 16, wherein the base regulator circuit module comprises:

- at least one programmable reference voltage;
- an error amplifier to compare the at least one programmable reference voltage to a positive supply voltage and to generate a voltage error;
- a comparator circuit to compare a sensed current to a current error; and
- logic to selectively control first and second driver pins to control associated circuitry to provide the desired power supply to the power supply output.

20. The circuit device of claim 16, wherein the selected circuitry cooperates with the base regulator circuit module to provide a parameterized buck regulator circuit, and wherein the selected circuitry comprises:

- a resistor including a first resistor terminal coupled to a positive voltage lead and including a second resistor terminal;
- a transistor device including a first terminal coupled to the second resistor terminal and to a current sense lead, a control terminal coupled to a first driver lead, and a second terminal coupled to an output node;
- a diode including an anode terminal coupled to a power supply terminal and a cathode terminal coupled to the output node;
- a boost capacitor coupled between a boost voltage lead and the output node;
- an inductor including a first inductor terminal coupled to the output node and a second inductor terminal coupled to the power supply output; and
- a filter capacitor including a first capacitor terminal coupled to the power supply output and a second capacitor terminal coupled to a second power supply terminal.

21. The circuit device of claim 16, wherein the base regulator circuit comprises:

- a voltage reference input pin responsive to a control circuit to receive a reference voltage;
- a digital compensator coupled to the voltage reference input pin and adapted to digitally compensate the reference voltage;
- a sigma-delta modulator coupled to the digital compensator;
- a pulse-width modulator coupled to the sigma-delta modulator and to a driver pin that is adapted to drive a gate of a switch; and
- frequency control firmware responsive to a control circuit to control a frequency associated with the sigma-delta modulator and with the pulse-width modulator.

22. The circuit device of claim 16, wherein the selected circuitry cooperates with the base regulator circuit module to provide a parameterized low drop out regulator circuit, and wherein the selected circuitry comprises:

- a resistor including a first resistor terminal coupled to a boost voltage lead and including a second resistor terminal coupled to a current sense lead;
- a first transistor device including a first terminal coupled to a second resistor terminal and to the current sense lead, a control terminal coupled to a first driver lead, and a second terminal coupled to the power supply output and to a feedback lead; and a filter capacitor including a first capacitor terminal coupled to the power supply output and a second capacitor terminal coupled to a power supply terminal.

23. The circuit device of claim 16, wherein the selected circuitry cooperates with the base regulator circuit module to provide a parameterized boost regulator circuit, and wherein the selected circuitry comprises:

an inductor including a first inductor terminal coupled a positive voltage terminal and a second inductor terminal coupled to a node;

a transistor device including a first terminal coupled to the node, a control terminal coupled to a second driver lead; and a second terminal coupled to a current sense lead;

a first resistor including a first resistor terminal coupled to the current sense lead and a second resistor terminal coupled to a boost voltage lead;

a diode including an anode terminal coupled to the node and a cathode terminal coupled to the power supply output;

a filter capacitor including a first capacitor terminal coupled to the power supply output and a second capacitor terminal coupled to a power supply terminal; and a voltage divider circuit coupled between the power supply output and a feedback lead.

24. The circuit device of claim 16, wherein the base regulator circuit module includes a plurality of programmable characteristics including a high accuracy output voltage, an output current limit, and a programmable switching frequency.

25. The circuit device of claim 16, further comprising a control circuit adapted to control a turn on power sequence associated with the first synchronous buck regulator circuit, the second synchronous buck regulator circuit, and the one or more programmable parameterized regulator circuits to reduce power supply variation during start up.

26. An circuit device comprising:

a plurality of programmable regulator circuits adapted to provide a respective plurality of regulated power supplies at a plurality of output terminals; each programmable regulator circuit of the plurality of programmable regulator circuits comprising:

a base regulator circuit module including multiple configurable parameters to support a plurality of regulator configurations, the base regulator circuit module comprising a plurality of leads; and selected circuitry coupled to the plurality of leads and adapted to cooperate with the base regulator circuit module to provide a selected type of regulator circuit having the power supply output.

27. The circuit device of claim 26, further comprising a control input responsive to a control circuit to receive at least one signal to control operation of the plurality of programmable regulator circuits.

28. The circuit device of claim 26, wherein the selected type of regulator circuit is selected from a group consisting of a synchronous buck regulator, a buck regulator, a low dropout (LDO) regulator, a boost regulator, and a boost buck regulator.

29. The circuit device of claim 26, wherein the plurality of programmable regulator circuits are programmable using at least one of a flash memory and a one-time programmable technology.

* * * * *